US005866079A

United States Patent [19]
Machida et al.

[11] Patent Number: 5,866,079
[45] Date of Patent: Feb. 2, 1999

[54] CERAMIC HONEYCOMB CATALYTIC CONVERTER

[75] Inventors: Minoru Machida; Toshio Yamada; Toshihiko Hijikata; Yukihito Ichikawa, all of Nagoya, Japan

[73] Assignee: NGK Insulators, Ltd., Japan

[21] Appl. No.: 298,285

[22] Filed: Aug. 31, 1994

[30] Foreign Application Priority Data

Sep. 3, 1993 [JP] Japan .................................... 5-220046
Oct. 29, 1993 [JP] Japan .................................... 5-272286

[51] Int. Cl.[6] ................................ B01D 53/34; F01N 3/10

[52] U.S. Cl. .......................... 422/179; 422/180; 422/221; 422/222; 60/299

[58] Field of Search ..................................... 422/179, 180, 422/221, 222; 60/299, 301; 428/114, 593; 501/95

[56] References Cited

U.S. PATENT DOCUMENTS

| | | | |
|---|---|---|---|
| 3,905,775 | 9/1975 | Sowards et al. | 422/180 |
| 3,938,959 | 2/1976 | Matsui et al. | 422/179 |
| 4,142,864 | 3/1979 | Rosynsky et al. | 422/179 |
| 4,144,627 | 3/1979 | Noda et al. | 29/890 |
| 4,161,509 | 7/1979 | Nowak | 422/179 |
| 4,233,351 | 11/1980 | Okumura et al. | 428/116 |
| 4,404,007 | 9/1983 | Tukao et al. | 55/523 |
| 4,795,615 | 1/1989 | Cyron et al. | 422/179 |
| 4,925,634 | 5/1990 | Yokokoji et al. | 422/179 |
| 4,929,429 | 5/1990 | Merry | 422/179 |
| 4,999,168 | 3/1991 | Ten Eyck | 422/179 |
| 5,008,086 | 4/1991 | Merry | 422/179 |
| 5,250,269 | 10/1993 | Langer | 422/179 |
| 5,376,341 | 12/1994 | Gulati | 422/179 |
| 5,494,881 | 2/1996 | Machida | 502/439 |
| 5,580,532 | 12/1996 | Robinson et al. | 422/179 |

FOREIGN PATENT DOCUMENTS

| | | | |
|---|---|---|---|
| 0205704 | 12/1986 | European Pat. Off. . | |
| 0573834 | 12/1993 | European Pat. Off. . | |
| 48-74843 | 9/1973 | Japan . | |
| 57-56615 | 4/1982 | Japan . | |
| 58-32917 | 2/1983 | Japan | 422/179 |
| 61-241413 | 10/1986 | Japan . | |
| 3-169347 | 7/1991 | Japan . | |
| 3-97521 | 10/1991 | Japan . | |

OTHER PUBLICATIONS

Corning Brochure, "Celcor" Honeycomb Catalyst Supports, Setting the Standard for Automotive Converter Substrate Tech.

Gulati et al., New Developments in packaging of ceramic honeycomb catalysts, Oct. 1992 pp. 91–92.

*Primary Examiner*—Hien Tran
*Attorney, Agent, or Firm*—Parkhurst & Wendel, L.L.P.

[57] ABSTRACT

A ceramic honeycomb catalytic converter having a novel canning structure capable of stably retaining a thin-walled ceramic honeycomb catalyst within a metal casing for a long period. A retainer member in the form of a ceramic fiber mat is disposed between an inner peripheral surface of the casing and an outer peripheral surface of the honeycomb catalyst, in a compressed state to generate a surface pressure for retaining the honeycomb catalyst in place. The ceramic fiber mat is composed of heat resistant and non-intumescent ceramic fibers, and has a compression characteristic which is substantially free from a significant increase or decrease over an operative temperature range of the catalytic converter. The casing may be provided with at least one locking member for locking the ceramic fiber mat in a flow direction of exhaust gas passed through the honeycomb catalyst.

16 Claims, 9 Drawing Sheets

CERAMIC HONEYCOMB CATALYTIC CONVERTER

BACKGROUND OF THE INVENTION

1. Field of the Invention

The present invention relates to a ceramic honeycomb catalytic converter which can be suitably used for an exhaust gas clarification system of an internal combustion engine for vehicles.

More particularly, the present invention pertains to a ceramic honeycomb catalytic converter which comprises a metal casing, a ceramic honeycomb catalyst accommodated in the casing, and a retainer member in the form of a ceramic fiber mat disposed in a compressed state between an outer surface of the honeycomb catalyst and an inner surface of the casing, thereby generating a surface pressure for holding the honeycomb catalyst within the casing.

2. Description of the Related Art

As known in the art, ceramic honeycomb catalytic converters of the kind mentioned above include a ceramic honeycomb catalyst wherein a number of flow channels having a polygonal cell-like cross-section and extending longitudinally through the honeycomb catalyst are defined by a peripheral wall and partition walls arranged inside of the peripheral wall. Conventional arrangement of such ceramic honeycomb catalytic converters is disclosed, for example, in JP-A-57-56,615, JP-A-61-241,413, JP-A-1-240,715, JP-U-55-130,012, JP-U-56-67,314 and JP-U-62-171,614.

Such ceramic honeycomb catalytic converters have been widely spread primarily due to a high open frontal area of the ceramic honeycomb catalyst and a resultant low pressure drop when exhaust gas is passed through the flow channels in the honeycomb catalyst, making it readily possible to achieve an excellent exhaust gas clarifying performance. As a typical example, an advanced ceramic honeycomb catalyst used for practical purposes has a partition wall thickness or rib thickness of approximately 0.170 mm and a flow channel density or cell density of 60 cells per unit cross-sectional area of 1 $cm^2$.

In accordance with a recent enhancement in the exhaust gas regulation as related to environmental problems, e.g., a requirement for reduction in the total emission amount of hydrocarbon in the LA-4 mode which is one of exhaust gas evaluation test modes in the United States, there is a strong demand for an improved ceramic honeycomb catalyst which is capable of achieving a distinguished exhaust gas clarifying performance as compared to conventional honeycomb catalysts. Specifically, in an operational state immediately after starting an engine, i.e., in the so-called cold start state, the exhaust gas clarifying efficiency undergoes a considerable deterioration because the catalyst is still not much warmed and hence it is not sufficiently activated. Thus, an early activation of the catalyst during the cold start state is considered as the most important task to clear the exhaust gas regulation. From such a viewpoint, as a general discussion, it has been proposed to reduce the thickness of the partition walls of the ceramic honeycomb structural body. The thin-walled ceramic honeycomb structural body serves on one hand to increase the open frontal area and thereby decrease the pressure loss and reduce the structure weight, and on the other hand to decrease the heat capacity of the catalyst and enhance the temperature elevation speed of the catalyst. In this case, a large geometric surface area of the honeycomb structural body can be obtained so that it is also possible to realize a compact structure. However, the thin-walled ceramic honeycomb structure, in turn, makes it difficult to achieve a predetermined minimum guarantee value, generally no less than 5 $kgf/cm^2$, preferably no less than 10 $kgf/cm^2$, of the isostatic destruction strength as one index of the structural strength. The term "isostatic strength" is defined in the JASO Standard M505-87, an automobile standard issued by The Corporation of Automobile Technology Association, Japan, and refers to a compressive destruction strength of the honeycomb structure under an isostatic or isotropic hydrostatic load, and is represented by a pressure value when the destruction occurs. Needless to say, ceramic honeycomb structural bodies with a poor isostatic strength require very careful handling, and may be readily subject to damage during the so-called "canning" process whereby the honeycomb catalyst is loaded into the converter casing and retained therein such that the honeycomb catalyst is prevented from dislocation due to vibrations, etc., which are encountered in practical use condition.

In many cases, the canning for retaining the ceramic honeycomb catalyst in place within a casing is effected by holding the outer peripheral surface of the honeycomb catalyst. However, the canning is sometimes effected in a different manner, e.g., by retaining the honeycomb catalyst solely in the exhaust gas flow direction, or in a combined mode in which the honeycomb catalyst is held at its outer peripheral surface while being retained in the exhaust gas flow direction. Normally, the canning is implemented using a ceramic fiber mat held compressed between the outer periphery of a honeycomb catalyst and the inner periphery of the metal casing, whereby the honeycomb catalyst is retained in place within the metal casing by a surface pressure generated by the ceramic fiber mat. In this instance, the catalyst canning structures, in particular the catalyst retainer members, are required to exhibit a high reliability in terms of the heat resistance. This is mainly due to the fact that, in view of the above-mentioned requirement for an early activation of the catalyst in the cold starting stage, the recent trend is to install the catalyst at a location close to the engine where the catalyst may be exposed to exhaust gas at a higher temperature, and/or to operate the engine under such a condition as to emit exhaust gas at a higher temperature. Emission of exhaust gas at a higher temperature may also result from an air/fuel ratio which is approximated to a stoichiometrical ratio in the high speed mode of the vehicle for satisfying various regulations regarding $CO_2$ emission, fuel consumption, etc.

The requirement for a highly reliable heat resistance characteristic of the catalyst canning structures, in particular the catalyst retainer members, is also associated with a recent progressive application of the exhaust gas emission regulations to motorcycles, which necessitates an exhaust gas clarification system suitable for motorcycle engines. That is, due to a space limitation in the case of motorcycles, a catalyst converter is often installed within a muffler so that the metal casing with a catalyst converter housed therein is maintained out of contact with the open air and therefore hardly cooled. Consequently, the metal casing and the retainer member are subject to heating up to an extremely high temperature.

As a ceramic fiber mat forming the catalyst retainer member for the canning structure, it has been a general practice to use an intumescent, i.e., thermally expansive mat composed of alumina-silica fibers added with vermiculite. However, conventional intumescent mats proved to undergo deterioration in their compression characteristic, when they are heated beyond an upper limit temperature of 800°–900°

C. More particularly, the surface pressure which had been acting to retain the honeycomb catalysts in place tends to decrease with the progress of deterioration. Then, it is no longer possible to stably retain the honeycomb catalyst in its initial position, so that the honeycomb catalyst tends to get premature wear as a result of friction with cone, retainer ring and/or end face cushion, etc., which are provided in the flow directional end region of the metal casing, or to be damaged due to intensive vibrations transmitted from the engines. Besides, the mats may scatter away when they are exposed to the intensive heat of exhaust gas. To overcome these problems, the ceramic honeycomb catalytic converter disclosed in the above-mentioned JP-A-61-241413 is combined with a ceramic fiber layer which is arranged between the intumescent mat and the inner surface of the metal casing. Such a solution, however, is not always appropriate because the resultant structural complexity makes it difficult to improve the manufacturing productivity of the ceramic honeycomb catalytic converters.

Besides, it should be noted that a reduced thickness of the partition walls of the ceramic honeycomb catalyst results inevitably in a decreased isostatic strength, and further that there may be instances wherein a thermal expansion of conventional mat rapidly increases the surface pressure generated thereby. The decreased isostatic strength of the thin-walled ceramic honeycomb catalyst in combination with the increased surface pressure may give rise to damaged to the ceramic honeycomb catalysts during their actual application. Thus, realization of a thin-walled ceramic honeycomb catalyst has been generally recognized to be practically incompatible with a stable retention of the honeycomb catalyst in place. To the knowledge of the inventors, there have been no proposals regarding the canning structure which is capable of stably retaining a thin-walled ceramic honeycomb catalyst in place for a long period.

SUMMARY OF THE INVENTION

It is therefore a primary object of the present invention to provide a ceramic honeycomb catalytic converter including a canning structure which is capable of stably retaining a honeycomb catalyst for a long period even when the honeycomb catalyst is of a thin-walled structure, on the basis of a novel and unique conception with which all the above-mentioned problems can be eliminated at the same time.

According to a first aspect of the present invention, there is provided a ceramic honeycomb catalytic converter which comprises a metal casing, a ceramic honeycomb catalyst accommodated in the casing, and a retainer member in the form of a ceramic fiber mat which is disposed in a compressed state between an outer surface of the honeycomb catalyst and an inner surface of the casing, thereby generating a surface pressure for retaining the honeycomb catalyst within the casing, wherein the ceramic fiber mat comprises heat resistant and non-intumescent ceramic fibers, which do not contain vermiculite or the like expansive agent, and wherein the ceramic fiber mat has a compression characteristic which does not exhibit a significant increase or decrease in a practical use temperature range of the catalytic converter.

As mentioned above, the arrangement according to the first aspect of the present invention is featured by a provision of the ceramic fiber mat arranged and held compressed between the ceramic honeycomb catalyst and the metal casing, wherein the ceramic fiber mat comprises heat resistant and non-intumescent ceramic fibers and has a compression characteristic which does not exhibit a significant increase or decrease in a practical use temperature range of the catalytic converter. Such a ceramic fiber mat serves to stably maintain the surface pressure of the mat at an optimal level without being subject to a significant fluctuation under practical use condition of the catalyst converter. Besides, the ceramic fiber mat as used in the present invention makes it possible to stably retain the ceramic honeycomb catalyst in position within the metal casing over a long period, even when the honeycomb catalyst is of a thin-walled structure. This serves to effectively protect the honeycomb catalyst from damage in a practical use condition.

According to a second aspect of the present invention, there is provided a ceramic honeycomb catalytic converter which comprises a metal casing, a ceramic honeycomb catalyst accommodated in the casing, and a retainer member disposed in a compressed state between an outer surface of the honeycomb catalyst and an inner surface of the casing, thereby generating a surface pressure for retaining the honeycomb catalyst in place within the casing, wherein the casing is provided with at least one locking member for locking the retainer member in a flow direction of exhaust gas passed through the honeycomb catalyst.

With the arrangement according to the second aspect of the present invention, the retainer member for retaining a ceramic honeycomb catalyst in place within the metal casing is locked in the exhaust gas flow direction, by means of at least one locking member provided for the metal casing. It is thus possible to effectively prevent loosening and dislocation of the ceramic honeycomb catalyst within the metal casing even when the retention force applied by the retainer member is decreased during the operation of the catalytic converter under a high temperature condition, and to thereby positively protect the ceramic honeycomb catalyst from premature wear and damage.

BRIEF DESCRIPTION OF THE DRAWINGS

The present invention will be further explained hereinafter with reference to to accompanying drawings, in which.

DESCRIPTION OF THE PREFERRED EMBODIMENTS

Figure 1A:
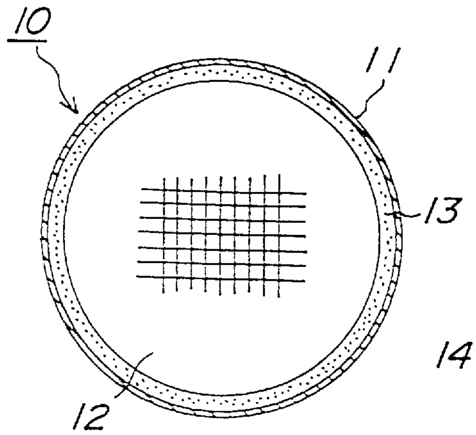
FIGS. 1A and 1B are cross-sectional views and longitudinal-sectional views, respectively, showing a first embodiment of the present invention as applied to a stuffing-type catalytic converter.
Figure 1B:
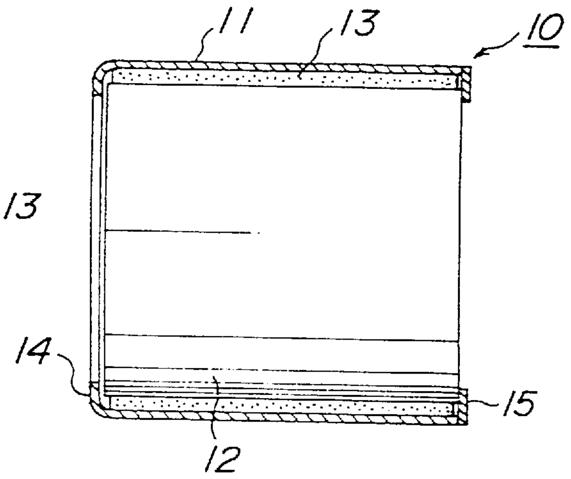

FIGS. 1A and 1B are respectively cross-sectional and longitudinal-sectional views of the first embodiment in which the present invention is applied to a catalytic converter of a stuffing-type. The catalytic converter 10 in this embodiment includes a metal casing or "can" 11 with a hollow cylindrical shape, a ceramic honeycomb catalyst 12 accommodated within metal casing 11, and a retainer member in the form of a ceramic fiber mat 13 which is arranged and held compressed between the inner peripheral surface of the metal casing 11 and the outer peripheral surface of the ceramic honeycomb catalyst 12. The ceramic honeycomb catalyst 12 is retained in place within the metal casing 11 by a surface pressure of the ceramic fiber mat 13. The metal casing 11 of this embodiment is of a monolithic construction with a hollow cylindrical shape, prepared by subjecting a heat resistant stainless steel sheet, such as SUS 304, etc., to a press operation. The metal casing 11 on its one axial end, i.e., on the left end in FIG. 1B, is provided with a flange 14 which protrudes radially inward. In this case, the flange 14 may be of a circumferentially continuous configuration. Using a suitable jig, the honeycomb catalyst 12 is stuffed, i.e., press-fitted into the metal casing 11, starting from the side of the other end, i.e., the left end side in FIG. 1B. When the honeycomb catalyst 12 is properly press-fitted into place within the metal casing 11, one end (i.e., the left end in FIG. 1B) of the honeycomb catalyst 12 is urged against the flange 14 with the ceramic fiber mat 13 held compressed between the outer surface of the honeycomb catalyst 12 and the inner surface of the metal casing 11. Such process of press-fitting the honeycomb catalyst 12 into the casing is known, per se, so that a further detailed description is omitted. Upon press-fitting the honeycomb catalyst 12 into the metal casing 12, a retainer ring 15 is spot-welded to the other end of the metal casing 11 so as to cooperate with the flange 14 to axially retain the honeycomb catalyst 12 within metal casing 11. Although the honeycomb catalyst 12 is retained in place within the metal casing 11 primarily by the surface pressure of the ceramic fiber mat 13, the flange 14 not only functions to position the honeycomb catalyst 12 at its set position when press-fitted into the metal casing 11, but also cooperates with the retainer ring 15 so as to prevent the honeycomb catalyst 12 from a minute axial displacement under practical use condition, which may be caused by a shear strain-originated deformation occurring in the ceramic fiber mat 13, thereby making it possible to positively retain the honeycomb catalyst 12 with a satisfactory reliability. Furthermore, as means for mounting the catalytic converter 10 to the exhaust system of an internal combustion engine, not shown, a metal member or so-called cone for the introduction or discharge of exhaust gas into or from the catalytic converter may be coupled to each axial end of the metal casing 11 by welding or the like, and the exhaust pipe and the cone may be welded to each other or they may be bolt-coupled together via a flange. Instead of using such a cone, the metal casing 11 may be welded directly to the exhaust pipe.

Figure 2A:
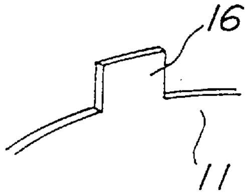
FIGS. 2A and 2B are perspective and fragmentary sectional views, respectively, showing one modification of the catalytic converter according to the first embodiment of the invention.
Figure 2B:
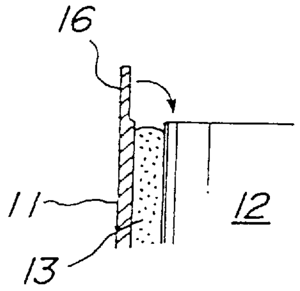

FIGS. 2A and 2B are respectively perspective and fragmentary sectional views, showing a modified example of the ceramic honeycomb catalytic converter 10 of the stuffing-type according to the first embodiment of the invention. In this example, instead of spot-welding a separately prepared retainer ring 15 to one end of the metal casing 11, the metal casing 11 at its one end is integrally provided with a plurality of protrusions 16 at locations which are circumferentially spaced from each other, so as to project axially from the end of the metal casing 11. After completion of the press-fitting operation of the honeycomb catalyst 12 into the metal casing 11, these protrusions 16 are bent radially inward as shown by the arrow in FIG. 2B, so that the honeycomb catalyst 12 can be retained axially in place within the metal casing 11.

Figure 3:
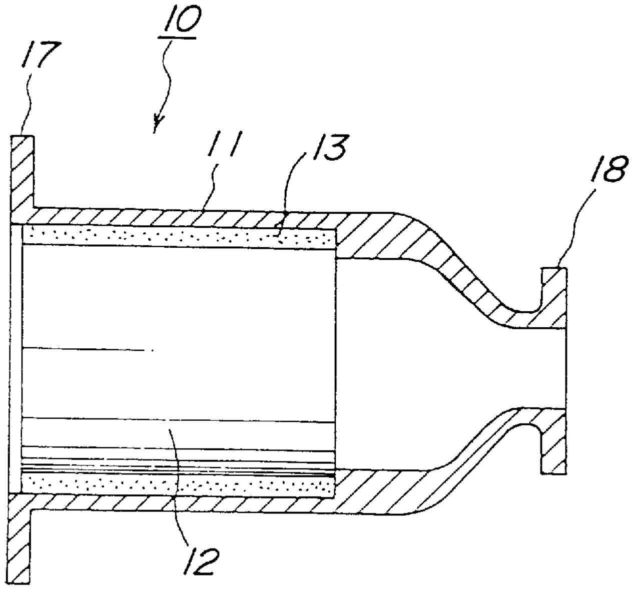
FIG. 3 is a longitudinal-sectional view showing another modification of the catalytic converter according to the first embodiment of the invention.

FIG. 3 is a longitudinal-sectional view illustrating another modified example of the ceramic honeycomb catalytic converter 10 of the stuffing-type according to the first embodiment of the invention. In this example, the metal casing 11 is a casting of a heat resistant stainless steel, with flanges 17, 18 integrally provided at both ends of the metal casing 11. The catalytic converter 10 according to this example is bolt-coupled to the exhaust pipe of the engine exhaust system by means of the flanges 17, 18, after the ceramic honeycomb catalyst 12 has been press-fitted into the metal casing 11. As a matter of course, the catalytic converter 10 may be of such a construction wherein it is coupled to the exhaust pipe by means of a retainer ring.

Figure 4A:
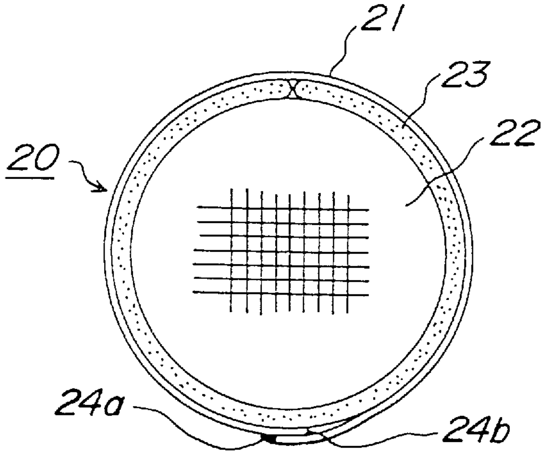
FIGS. 4A and 4B are cross-sectional and fragmentary side views, respectively, showing a second embodiment of the present invention as applied to a rolling-type catalytic converter.
Figure 4B:
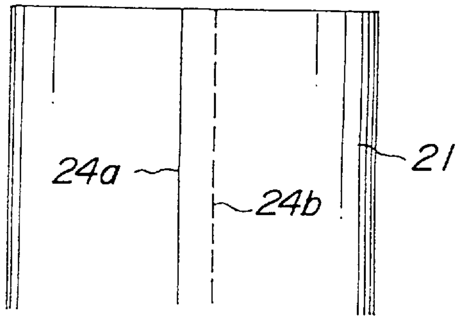

FIGS. 4A and 4B are respectively cross-sectional and partial side views showing the second embodiment of the catalyst converter according to the present invention which is of a rolling-type. The catalytic converter 20 in this embodiment also includes a metal casing 21 of a hollow cylindrical shape, a ceramic honeycomb catalyst 22 accommodated within the metal casing 21, and a ceramic fiber mat 23 arranged and held compressed between the inner surface of the metal casing 21 and the outer surface of the honeycomb catalyst 22, wherein the honeycomb catalyst 22 is retained in place within the metal casing 21 by a surface pressure of the ceramic fiber mat 23. The metal casing 21 in this embodiment is formed after covering the outer surface of the honeycomb catalyst 22 by the ceramic fiber mat 23, by cylindrically wrapping up a heat resistant stainless steel sheet, such as SUS 304, over the ceramic fiber mat 23 such that both circumferential ends 24*a*, 24*b* of the stainless steel sheet are overlapped with, and welded to each other. Each circumferential end 24*a*, 24*b* of the stainless steel sheet forming the metal casing 21 may extend linearly in the axial direction, so that the welding line extends linearly along one circumferential end 24*a*. After forming the metal casing 21 in such a manner as mentioned above, a retainer ring, not shown, may be spot-welded to the both axial ends of the metal casing 21 as in the first embodiment explained above. It should be noted that, instead of welding a separate retainer ring to one axial end of the metal casing 21, it is also possible to integrally provide the metal casing 21 with axial protrusions similar to those described with reference to FIGS. 2A and 2B, at a plurality of circumferential locations, and to bend them radially inward upon completion of wrapping-up of the stainless steel sheet, for axially retaining the honeycomb catalyst 22 within metal casing 21.

Figure 5A:
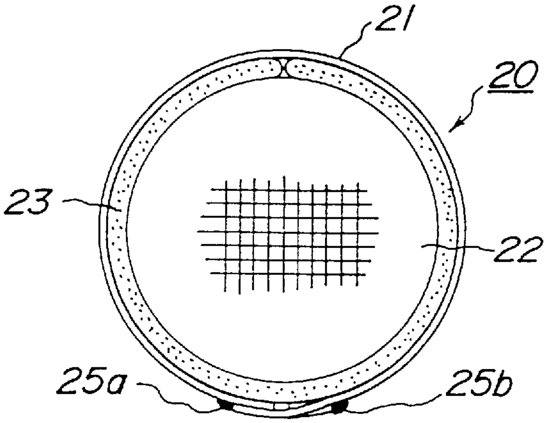
FIGS. 5A and 5B are cross-sectional and fragmentary side views, respectively, showing one modification of the catalytic converter according to the second embodiment of the invention.
Figure 5B:
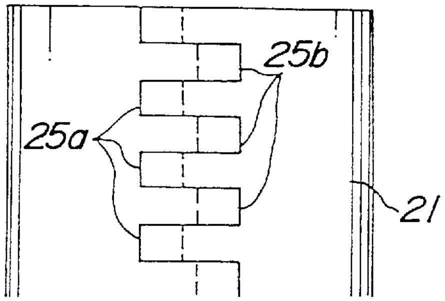

FIGS. 5A and 5B are respectively cross-sectional and partial side views, showing a modified example of the catalytic converter 20 of the rolling-type according to the second embodiment mentioned above. The catalytic converter 20 of this example is basically same in structure as the second embodiment, but differs therefrom in that each circumferential end 25*a*, 25*b* of the stainless steel sheet forming the metal casing 21 is of a comb-teeth profile with a staggered pattern.

Figure 6:
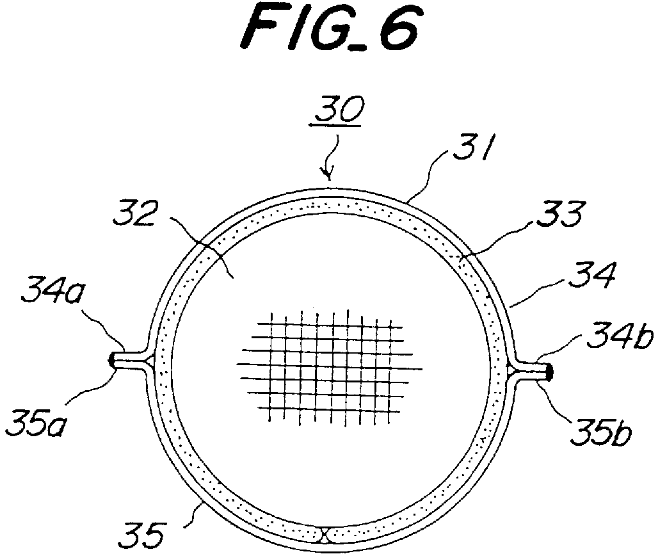
FIG. 6 is a cross-sectional view showing a third embodiment of the present invention as applied to a clam-shell-type catalytic converter.

FIG. 6 is a cross-sectional view showing the third embodiment of the catalytic converter according to the present invention, which is of a clam-shell structure. The catalytic converter 30 of this embodiment also includes a metal casing 31 of a hollow cylindrical shape, a ceramic honeycomb catalyst 32 accommodated within the metal casing 31, and a ceramic fiber mat 33 arranged and held compressed between the inner surface of the metal casing 31 and the outer surface of the honeycomb catalyst 32, wherein the honeycomb catalyst 32 is retained in place within the metal casing 31 by the surface pressure of the ceramic fiber mat 33. The metal casing 31 of this embodiment is of a two-piece structure comprising a pair of half shell members 34, 35 each having a semi-circular cross-section, which are welded together at flanges 34*a*, 34*b*, 35*a*, 35*b* extending axially along the respective circumferential ends of the half shell members 34, 35. It should be noted that retainer rings for axially retaining the honeycomb catalyst 32 may be welded to the inner surface of the metal casing 31 at those areas thereof which are opposed to the respective axial ends of the honeycomb catalyst 32.

Commonly with the above-mentioned first through third embodiments, each of the ceramic honeycomb catalysts 12, 22, 32 has a ceramic honeycomb structure with a large number of cell-like through-holes of a polygonal cross-section, arranged adjacent to each other with partition walls therebetween which are provided inside the circumferential wall of the ceramic catalyst. For practical applications, there are used honeycomb catalysts fabricated in various structures with a circular profile (round type), an elliptical profile (oval type), an elongated circular profile (field track type) and other non-circular profile in the respective cross-sections which are perpendicular to the flow direction. Furthermore, besides a ceramic honeycomb structure with a straight flow directional axis, there is also known a ceramic honeycomb structure with a curved flow directional axis. Referring to the relationship between the cross-sectional profile of the honeycomb structure and the various canning structures in the above-mentioned embodiments, the stuffing-type of the first embodiment allows a relatively easy canning of the honeycomb structure with a round cross section, while the rolling-type of the second embodiment or the clam-shell-structure of the third embodiment allows an easy canning of the honeycomb structure with an oval profile, a field track profile or other non-circular profile.

Advantageously, the thin-walled ceramic honeycomb structure, a primary object of the catalytic converter according to the present invention, has a circumferential wall thickness of at least 0.1 mm, a partition wall thickness of not less than 0.050 mm but not greater than 0.150 mm, an open frontal area of 65–95%, an A-axis compression strength of not less than 50 kgf/cm$^2$ and a B-axis compression strength of not less than 5 kgf/cm$^2$, for example. Such a thin-walled ceramic honeycomb structure is more fully disclosed in the applicants' copending U.S. patent application No. 08/216,429 filed Mar. 23, 1994, and assigned to the assignee of this application, so that the disclosure of said copending application is herein incorporated by reference.

The A-axis compression strength refers to a compression strength prescribed in the aforementioned JASO Standard M505-87, and corresponds to the destruction strength that a ceramic honeycomb structure exhibits when applied with a compression load in the flow direction of the honeycomb structure, i.e., perpendicularly to the cross-section thereof. The B-axis compressive strength refers to the destruction strength that the ceramic honeycomb structure exhibits when applied with a compression load in a direction parallel to the cross-section of the honeycomb structure and perpendicular to the partition walls, and is likewise prescribed by said JASO Standard. Furthermore, the isostatic destruction strength is also prescribed by said JASO Standard as a compression destruction strength that the honeycomb structure exhibits when isostatically applied with a hydrostatic load, as already described. Since the test for the A-axis compressive strength takes place by applying a compression load to a honeycomb structure testpiece in its flow direction, the A-axis compressive strength of the honeycomb structure is not affected much by such a defect as partition wall deformation, etc, and has a relatively strong correlation with the material strength. In contrast, though the B-axis compressive strength depends also on the material strength, it is heavily affected by a defect such as a partition wall deformation, etc. In this regard, the isostatic destruction strength is comparable to the B-axis compressive strength. With this in view, it is understood that both isostatic destruction strength and B-axis compressive strength may be considered indices to represent the structural strength characteristic. However, it should be noted that the test for the B-axis compressive strength is implemented by measuring the compressive strength of the honeycomb structure in the absence of its circumferential wall, so that the B-axis compressive strength obtainable with the honeycomb structure is essentially free from the effects of the circumferential wall structure. Needless to say, the circumferential wall serves as an outer shell to protect the honeycomb structure against external pressure, and the circumferential wall surface bears the load applied to the honeycomb structure in the process of canning. Breakage of the circumferential wall gives rise to a trouble that the partition walls adjacent to and just inside the circumferential wall undergo abnormal load, whereby the partition walls are subject to sequential breakage one after another. In this respect, it can be appreciated that the circumferential wall carries a significant role for the partition wall safeguarding. The respective tests for the isostatic destruction strength and the B-axis compressive strength are done under different loading conditions, wherein the respective testpieces may exhibit different stress distributions. While no definite correlation is recognized between the isostatic destruction strength and the B-axis compressive strength, there exists a tendency that the greater the B-axis compressive strength, the higher the isostatic destruction strength. As mentioned above, both A-axis and B-axis compressive strengths may be considered basic indices to represent the strength characteristic of the honeycomb structure; the former being an index mainly showing the influence of the material strength, and the latter rendering another index mainly indicating the influence of the honeycomb structure. The isostatic destruction strength indicating the characteristic of practical structural strength is considered as indicating a multilateral effect of the material selected for a honeycomb structure, the honeycomb structure for a catalytic converter, and the circumferential wall construction represented by a circumferential wall thickness. When the circumferential wall moldability is taken into account, it is advantageous for the circumferential wall to have a thickness of not less than 0.15 mm.

Thin-walled ceramic honeycomb catalysts with relatively low isostatic destruction strength make themselves a primary object for the catalytic converter according to the present invention. As previously stated, particularly where the catalytic converter is used in the proximity of an engine and exposed to a high temperature condition with the exhaust gas temperature exceeding 900° C., for example, for achieving an early activation of the catalyst in the cold-start stage, the catalyst canning structures and specifically the catalyst retainer members are required to exhibit a highly reliable heat resistance characteristic. Therefore, in embodying the present invention, the ceramic fiber mat arranged and held compressed between the inner surface of the metal casing and the outer surface of the honeycomb catalyst for retaining the honeycomb catalyst in place within the metal casing by the surface pressure comprises heat resistant and non-intumescent ceramic fibers having the compression characteristic which is substantially free from a significant volumetric fluctuation within a practical temperature range of the catalyst converter. The ceramic fiber mat providing favorable serviceability for the present invention comprises at least one member selected from a group consisting of alumina, mullite, silicon carbide, silicon nitride and zirconia, and has a diameter of fibers which is not less than 2 μm but not greater than 6 μm. Advantageously, the ceramic fiber mat has a nominal thickness of 5–30 mm and a bulk density of 0.05–0.3 g/cm$^3$ in the uncompressed state, and has such a compression characteristic that, when the ceramic fiber mat has been applied with an initial surface pressure of 2 kgf/cm$^2$ at a room temperature and then heated to 1,000° C., it is still capable of generating a surface pressure of at least 1 kgf/cm$^2$. From the viewpoint of high temperature strength characteristic and production cost, mullite fibers are suited for practical use.

The inventors conducted a comparative test following the procedure below, to examine over the thermal expandability of those testpieces, two specimens of which were a conventional wire mesh and likewise and a intumescent fiber mat, and the rest of which were heat resistant and non-intumescent ceramic fiber mats selected for the present invention. The intumescent ceramic fiber mats used in this test were comprised of "INTERAM", a product of Sumito 3M, and "XPE Ceramic Fiber Paper", a product of Carborundum, both of which are commercially available. Meanwhile, the heat resistant and non-intumescent ceramic mats were comprised of "MAFTEC", a product of Mitsubishi Chemical Industries, and "DENKA ALCEN", a product of Denki Kagaku Kogyo.

(1) Each testpiece is prepared by cutting in dimensions of 50×50 mm, and held between silica glass sheets, and then set on a testing machine equipped with an electric furnace.

(2) The testpiece is then applied with an initial surface pressure of 2 kgf/cm$^2$ at room temperature.

(3) The electric furnace is heated and the surface pressure is measured at every increment of 100° C. up to 1000° C., starting from an in-furnace atmospheric temperature of 100° C.

Figure 7:
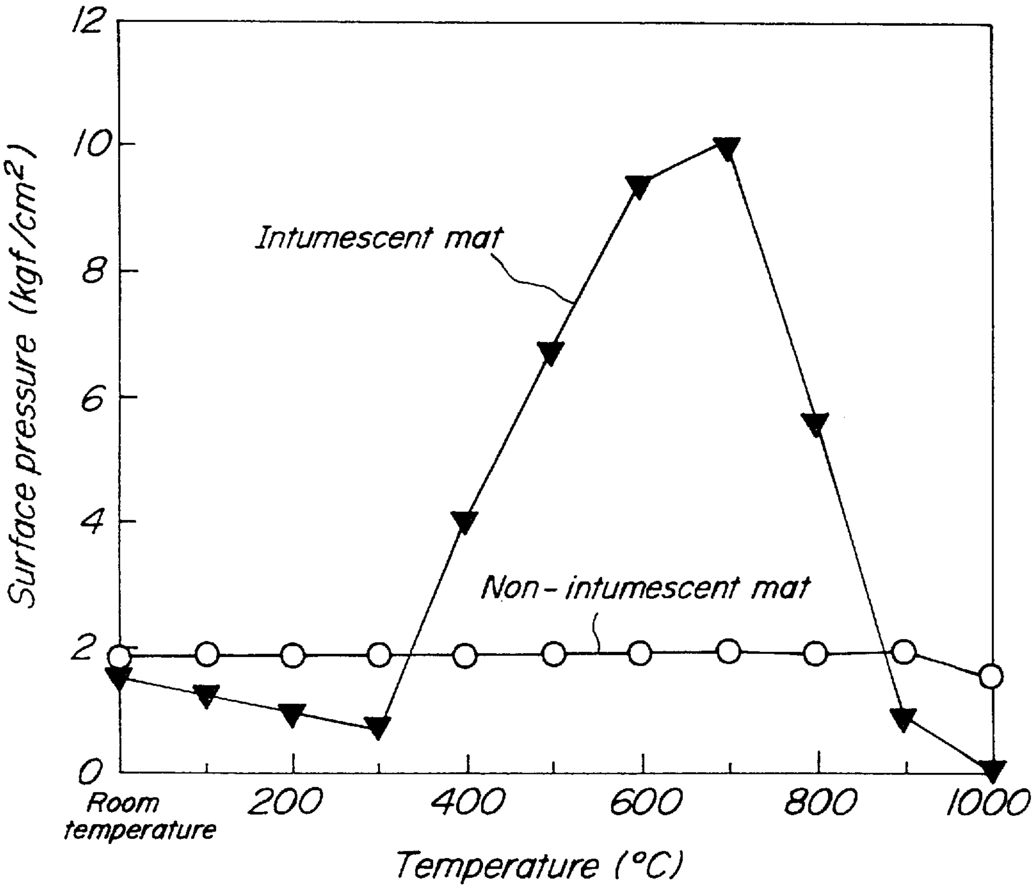
FIG. 7 is a graph showing the compression characteristic under a heated condition, of a conventional intumescent ceramic fiber mat and a heat durable, non-intumescent ceramic fiber mat used in the invention.

The results of this pyro-compression characteristic test are shown in FIG. 7 and Table 1.

TABLE 1

| | | Surface pressure (kg/cm$^2$) In-furnace space temp. (°C.) | | | | | | | |
|---|---|---|---|---|---|---|---|---|---|
| | | Room temp | 300 | 600 | 700 | 800 | 900 | 1000 | Evaluation |
| Wire mesh | SUS 304 | 1.9 | 1.8 | 1.3 | 0.7 | 0.1 | — | — | X |
| | INC 750 | 2.0 | 2.1 | 1.8 | 1.2 | 1.0 | 0 | — | X |
| Intumescent mat | INTERAM mat 5.4t | 1.5 | 0.7 | 9.2 | 10.0 | 5.6 | 0.9 | 0 | X |
| | XPE Ceramic Fiber Paper 4.9t | 1.7 | 0.4 | 10.2 | 8.1 | 3.2 | 0.8 | 0 | X |
| Heat resistant/non-intumescent mat | | | | | | | | | |
| Blanket type | Thickness - 7 mm Bulk density 0.17 g/cm$^3$ | 1.8 | 1.8 | 1.9 | 1.9 | 1.9 | 1.9 | 1.6 | ○ |
| | Thickness - 12.5 mm Bulk density 0.10 g/cm$^3$ | 1.9 | 1.9 | 1.8 | 1.8 | 1.8 | 1.6 | 1.4 | ○ |
| Mat type | Thickness - 25 mm Bulk density 0.25 g/cm$^3$ | 1.8 | 1.8 | 1.7 | 1.6 | 1.6 | 1.4 | 1.1 | ○ |
| | Thickness - 25 mm Bulk density 0.10 g/cm$^3$ | 1.9 | 1.8 | 1.7 | 1.6 | 1.6 | 1.5 | 1.3 | ○ |

○: Acceptable
X: Not acceptable

As can be appreciated from FIG. 7 and Table 1, with the retainer member comprising a wire mesh or a intumescent ceramic fiber mat, the surface pressure required for stably retaining the ceramic honeycomb catalyst in place is not available under the pyro-conditions with the temperature exceeding 900° C., whereby the honeycomb catalyst is subject to damage due to vibrations from the engine. In the case of a intumescent ceramic fiber mat, the mat surface pressure goes up excessively within a temperature range of 500°–800° C., with the result that a thin-walled honeycomb catalyst with a relatively low isostatic destruction strength is subject to damage under an excessive mat surface pressure. In contrast, both the blanket and mat type of a non-intumescent ceramic fiber mat usable in the present invention are found serviceable to safeguard the honeycomb catalyst against damage, as can be appreciated from FIG. 7 and Table 1, due to the compression characteristic which is substantially free from significant increase or decrease over a temperature range from room temperature to 1000° C., namely over the entirety of a practical temperature range of the catalyst converter.

Next, the inventors implemented a heated press-removal test to examine over time-progressive heat resistance of a conventional intumescent ceramic fiber mat and the heat resistant and non-intumescent ceramic fiber mats for the present invention. This heated press-removal test was effected similarly to the pyro-compression characteristic test, using two different testpieces; one being a intumescent ceramic mat with a nominal thickness of 5.4 mm, and the other being a heat resistant and non-intumescent ceramic fiber mat having a nominal thickness of 7 mm. Also used for this test were a metal casing of stuffing-type comprising SUS 304 and having an inner diameter of 62 mm, and a round type ceramic honeycomb catalyst having an outer diameter of 55 mm and a length of 45 mm.

(1) Each testpiece is brought, together with a honeycomb catalyst, into a metal casing which is then placed in a heating/cooling testing machine including a propane gas burner (referred to hereinafter as “burner tester”), and subsequently heated and cooled for 100 cycles, each comprised of heating up to 950° C. for 10 minutes and cooling down to 100° C. for 5 minutes.

Figure 8:
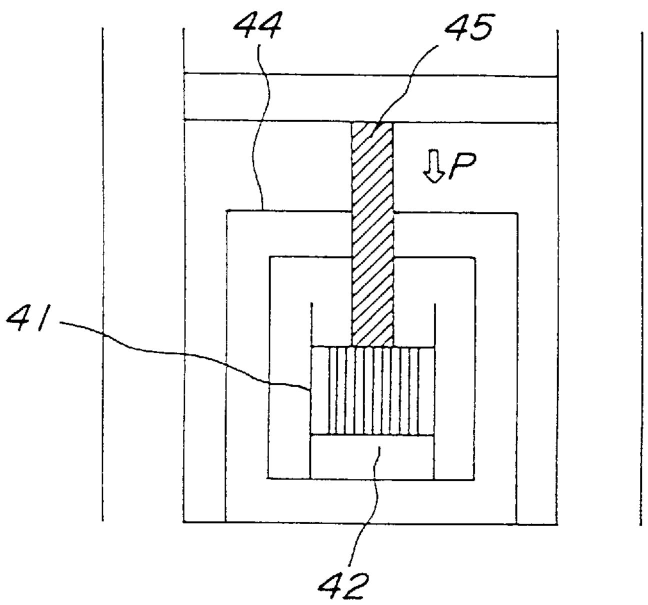
FIG. 8 is a schematic diagram showing the manner of performing a push-out experiment under a heated condition, with respect to a conventional intumescent ceramic fiber mat and a heat resistant and non-intumescent ceramic fiber mat used in the invention.

(2) As shown in FIG. 8, an electric furnace 44 is set in the burner tester and the metal casing 41 with the testpiece and honeycomb catalyst 42 retained therein is put into the electric furnace 44, wherein the metal casing 41 is maintained over a temperature range from room temperature to 950° C.

(3) A load is applied to the honeycomb catalyst 42 via a silica rod 45, and the press-removal load is measured. The results of the heated press-removal test is as shown in Table 2.

TABLE 2

| Retainer members | | Canning | Press-removal load (kgf) Room temp. | 950° C. | Evaluation |
|---|---|---|---|---|---|
| Comparative Example (An intumescent mat) | INTERAM mat | stuffing-type | 275 | 0 | X |
| Present invention (A heat resistant/non-intumescent mat) | Mat type | stuffing-type | 80 | 21 | ○ |
| | Blanket | stuffing-type | 26 | 7 | ○ |

○: Acceptable
X: acceptable

As can be appreciated from Table 2, with the intumescent ceramic fiber mat, the press-removal load turned out to be zero at 950° C., signifying that the mat surface pressure required for retaining the honeycomb catalyst in place was totally lost so that the honeycomb catalyst spontaneously fell from inside the metal casing. In contrast, in the case of the heat resistant and non-intumescent ceramic fiber mat serviceable in the present invention, there came a finding that the press-removal load was still surviving to be effective, implying the practicability to stably retain the honeycomb catalyst in position with the surface pressure of the heat resistant and non-intumescent fiber mat even under the temperature which is as high as 950° C.

Further, the inventors undertook a heated vibration test to examine the retainer members comprised respectively of the conventional intumescent ceramic fiber mat and SUS 304 wire mesh as well as the heat resistant and non-intumescent ceramic fiber mat. This heated vibration test started with inserting into a clam-shell-type metal casing an oval type ceramic honeycomb catalyst having a major diameter of 143 mm, a minor diameter of 98 mm, a length of 152 mm and a volume of 1700 cc, together with a testpiece retainer member. Then, the test was carried out wherein the metal casing accommodating the honeycomb catalyst and the testpiece retainer member underwent 10 cycles of heating and cooling, each cycle being comprised of heating up to an inlet gas temperature of 900° C. for 5 minutes and cooling down to 100° C. for 5 minutes and various vibro-accelerations under a constant frequency of 200 Hz. Thereafter, measurement was effected to ascertain the displacement of the honeycomb catalyst from its initial set position within the metal casing. The results of the heated vibration test are as shown in Table 3, together with the absolute values of displacement.

TABLE 3

| | | | Comparative Example | | Present Invention Heat resistant/non-intumescent mat | |
|---|---|---|---|---|---|---|
| | | | Intumescent mat | Wire mesh | | |
| Retainer members | | | INTERAM mat | SUS 304 | Mat type | Blanket type |
| Heated vibrating test results Index: | temp. 900° C. | Acceleration 20G | ○ (0) | ○ (0) | ○ (0) | ○ (0) |
| | | 30G | ○ | ○ | ○ | ○ |

TABLE 3-continued

| Retainer members | | Comparative Example Intumescent mat INTERAM mat | Comparative Example Wire mesh SUS 304 | Present Invention Heat resistant/non-intumescent mat Mat type | Present Invention Heat resistant/non-intumescent mat Blanket type |
|---|---|---|---|---|---|
| Displacement (mm) | 40G | (0.2) (1.1) | (0.2) (1.2) | (0) (0.2) | (0) (0.3) |
| Evaluation | | X | X | ○ | ○ |

○: Acceptable
X: Not acceptable each testpiece retainer member into each of the metal casing of various structures together with a ceramic honeycomb catalyst, followed by placing each metal casing in the burner tester. The test was performed by subjecting each metal casing to 100 cycles of heating and cooling for the evaluation of the durability, each cycle being comprised of heating up to 900° C. for 10 minutes and cooling down to 100° C. for 5 minutes, followed by measuring the push-removal load at a given atmospheric temperature within an electric furnace. The results of this heated push-removal test are as shown in Table 4.

TABLE 4

| | | Push-removal load kg (post durability testing with heating up to 900° C., using a burner) | | | | | | |
|---|---|---|---|---|---|---|---|---|
| | | Stuffing-type | | rolling-type | | Clam-shell-type | | |
| | | Room temp. | 950° C. | Room temp. | 950° C. | Room temp. | 950° C. | Evaluation |
| Comparative Example Intumescent mat | INTERAM mat | 275 | 0 | 190 | 0 | 290 | 0 | X |
| Present Invention Heat resistant/non-intumescent mat | Blanket type | 80 | 21 | 53 | 15 | 78 | 20 | ○ |
| | Mat type | 26 | 7 | 20 | 5 | 22 | 6 | ○ |

○: Acceptable
X: Not acceptable

As can be appreciated from Table 3, in comparison with the intumescent ceramic fiber mat and the wire mesh both of which gave rise to unallowable displacement of the honeycomb catalysts from their initial set positions when exposed to high-frequency vibrations, the heat resistant and non-intumescent ceramic fiber mat serves to maintain the displacement of the honeycomb catalyst within a permissible limit even when accelerated under a severe vibratory condition. Therefore, it can be clearly recognized that the heat resistant and non-intumescent ceramic fiber mat is particularly suitable as a canning structure for effectively retaining the ceramic honeycomb catalyst in place within the metal casing against intensive vibro-accelerations transmitted from an engine, as is the case for a honeycomb catalyst which is arranged in proximity of the engine and is thereby exposed to intensive heat of exhaust gas.

Furthermore, the inventors implemented a push-removal test after the durability test, in order to evaluate the time-progressive heat resistance of the heat resistant and non-intumescent ceramic fiber mats, i.e., the retainer members for the present invention, in comparison with those of the conventional intumescent ceramic fiber mat, which were combined with the above-mentioned three different canning structures. The push-removal test was started with putting As can be appreciated from Table 4, with the conventional intumescent ceramic fiber mat, the push-removal load at 950° C. turned out to be zero regardless of the canning structures of the metal casing, and the ceramic honeycomb catalyst was found falling off the metal casing. In contrast, the heat resistant and non-intumescent ceramic fiber mat for the present invention revealed that the push-removal load is maintained at a level which is sufficient for a proper retention of a honeycomb catalyst even when exposed to intensive heat, regardless of the difference in the canning structure. The diameter of the ceramic fibers forming the heat resistant and non-intumescent ceramic fiber mat has been measured to be within a range from 2–6 $\mu$m. Also, the bulk density of the heat resistant and non-intumescent ceramic fiber mat has been measured to be within a range from 0.10–0.25 g/cm$^3$. Since the ceramic fiber mat serving as a retainer member in a canning structure is required to produce and maintain a proper surface pressure along the entire periphery of the honeycomb catalyst while compensating for the fluctuation in the clearance or gap occurring due to the dimensional tolerances respectively of the inner diameter of the metal casing and the outer diameter of the ceramic honeycomb catalyst at the stage of canning the honeycomb catalyst, it is necessary for the ceramic fiber mat to have a proper thickness and an adequate bulk density. In this connection, in the case of practical canning operation, it is necessary for the ceramic fiber mat to be compressed at a very high rate of 100–200 mm/min in view of a satisfactory efficiency. It is also vital to consider a remarkable difference which the above-mentioned compression rate holds with reference to a low compression rate of 1 mm/min. Considering such a difference, a ceramic fiber mat compression test was implemented, simulating a practical canning at 150 mm/min, followed by measurement of the surface pressure at the time each of various mats was compressed until a given gap came into existence. The test results are as shown in Table 5 below.

TABLE 5

| | Mat thickness (mm) | Bulk density (g/cm$^3$) | Bulk density/ mat thickness | Evaluation | |
|---|---|---|---|---|---|
| Comparative Example | 4.9 | 0.70 | 0.14 | X (initial surface went up abruptly) | Damage to the honeycomb |
| Present Invention | 5 | 0.30 | 0.060 | Δ (initial surface went up) | Honeycomb suffered no damage |
| | 7 | 0.30 | 0.043 | Δ (initial surface went up) | |
| | 12.5 | 0.17 | 0.014 | ○ | |
| | 12.5 | 0.13 | 0.010 | ○ | |
| | 12.5 | 0.10 | 0.0080 | ○ | |
| | 25 | 0.065 | 0.0026 | ○ | |
| | 25 | 0.05 | 0.0020 | ○ | |
| | 30 | 0.05 | 0.0017 | Δ (canning being difficult) | |
| Comparative Example | 40 | 0.05 | 0.0013 | X (canning being impracticable) | |

As can be appreciated from Table 5, it was found that there exists a certain proper range over the ratio between the bulk density and thickness of the mat before compression. Namely, if the ratio between the mat bulk density and the mat thickness is too large, the initial mat surface pressure goes up abruptly right after the compression, with the surface pressure subsequently getting declined and then stabilized. Such an abrupt rise of the mat surface pressure may inflict the honeycomb structure damage. On the other hand, if the ratio between the mat bulk density and the mat thickness is small, the initially produced surface pressure is stably maintained whereby the honeycomb structure is prevented from damage. As mentioned above, an abrupt rise of the initially produced surface pressure concurs with the rise of danger that the honeycomb structure tends to suffer damage at the time of canning. It should be further noted that in the case of an excessively small ratio between the bulk density and the thickness of the mat, namely when the mat thickness goes beyond 30 mm, the thickness becomes excessive to make difficult various mat handling, such as setting of the mat in a metal casing and compression of the mat. The mat with a thickness of over 40 mm failed to find normal serviceability with no chance of being canned in a metal casing. From these observations, it has been confirmed that the ceramic fiber mats having a bulk density of 0.05–0.30 g/cm$^3$, particularly 0.05–0.20 g/cm$^3$, and a thickness of 5–30 mm, especially 10–25 mm are very suitable for the present invention.

It will be appreciated from the foregoing detailed descriptions that, according to the above-mentioned aspect of the present invention, the ceramic fiber mat held compressed between the outer surface of the ceramic honeycomb catalyst and the inner surface of the metal casing is comprised of heat resistant and non-intumescent ceramic fibers, and has such a compression characteristic which is substantially free from significant change within the practical temperature range of the catalyst converter. It is therefore possible to avoid fluctuation of the surface pressure of the mat under actual use conditions of the catalyst converter and stably maintain the surface pressure at an optimal value for a long period. It is further possible to stably retain a ceramic honeycomb catalyst within a metal casing over a long period, positively protecting the honeycomb catalyst against damage during use, even when it is of a thin-walled structure.

Figure 9:
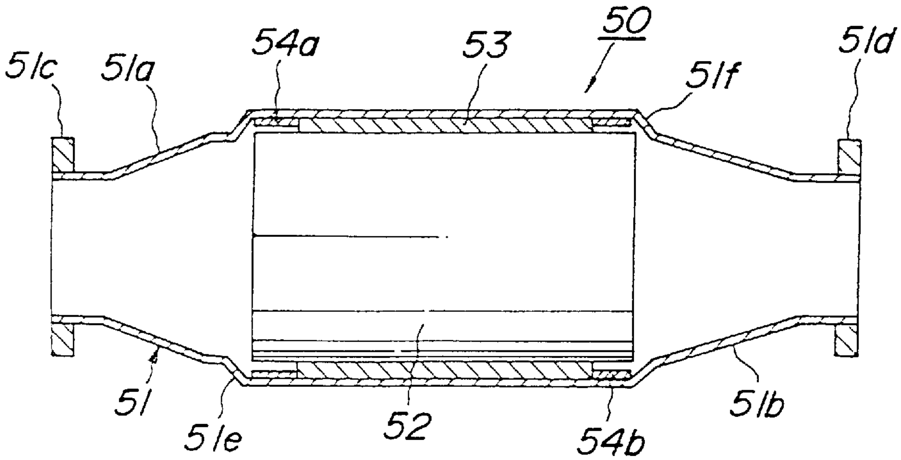
FIG. 9 is a longitudinal-sectional view showing the catalytic converter according to a fourth embodiment of the present invention.

FIG. 9 is a longitudinal-sectional view showing a fourth first embodiment of the catalytic converter according to the present invention, which may be installed, e.g., in the exhaust system of a gasoline engine for a passenger car. The catalytic converter 50 of this embodiment includes a metal casing 51 of a clam-shell-type having a hollow cylindrical shape, for example. A ceramic honeycomb catalyst 52 is accommodated within the metal casing 51, and has a plurality of passages for passing therethrough exhaust gas from an internal combustion engine. Generally, the metal casing 51 of the clam-shell-type is formed by welding a pair of half shell members of a semi-circular cross-section section, for example, along their circumferential ends which are butt-joined together. In the present embodiment, a retainer member 53 is arranged and held compressed between the outer surface of the honeycomb catalyst 52 and the inner surface of the metal casing 51. Preferably, the retainer member 52 is in the form of a heat resistant and non-intumescent ceramic fiber mat containing substantially no organic binder nor vermiculite and the like expansive component, and having a compression characteristic which is substantially free from significant change within the practical temperature range of the catalytic converter 50. In this case, the honeycomb catalyst 52 is retained at a predetermined location within the metal casing 51 by the surface pressure which is derived from the recovery force of the retainer member 53 from the compressed state. A pair of clamp rings 54*a*, 54*b* are provided as locking members for locking the retainer member 53 in the exhaust gas flow direction, at respective positions corresponding to the flow directional ends of the honeycomb catalyst 52. These clamp rings may be welded to the inner surface of the metal casing 51, so that the retainer member 53 is tightly clamped between the clamp rings 54*a*, 54*b* on both sides in the flow direction. The clamp rings 54*a*, 54*b* may be formed of an annular-shaped metal wire net or rings comprised of suitable metal or ceramic. It should be noted that both end portions of the metal casing 51 are formed as cone portions 51*a*, 51*b* which are provided with flanges 51*c*, 51*d* for the connection to the exhaust pipe respectively at their distal ends. In this case, the clamp rings 54*a*, 54*b* may be held in engagement with shoulder portions 51*e*, 51*f* provided in front of the cone portions 51*a*, 51*b* on the inner surface of the metal casing 51.

Figure 10:
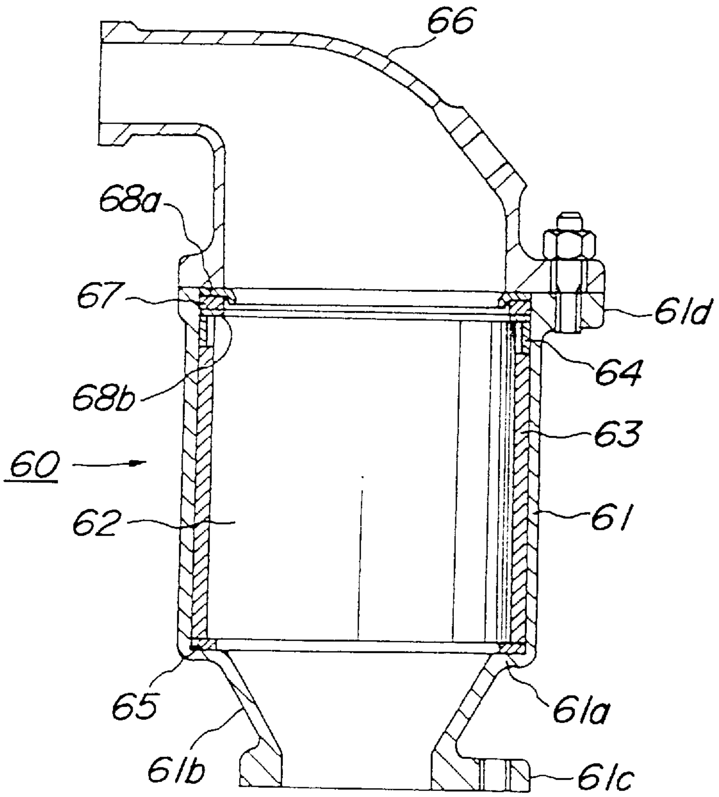
FIG. 10 is a longitudinal-sectional view showing the catalytic converter according to a fifth embodiment of the present invention.

FIG. 10 is a longitudinal-sectional view showing the fifth embodiment of the catalytic converter according to the present invention, which can be installed in the exhaust system of a gasoline engine for a passenger car as in the fourth embodiment explained above. The catalytic converter 60 of this embodiment includes a hollow cylindrical metal casing 61, and is of a stuffing-type into which a ceramic honeycomb catalyst 62 is press-fitted in the axial direction, starting from one end of the metal casing 61. Also in this embodiment, preferably, a retainer member 63 in the form of a mat comprising heat resistant and non-intumescent fibers is arranged and held compressed between the outer surface of the honeycomb catalyst 62 and the inner surface of the metal casing 61. A clamp ring 64 for clamping the retainer member 63 is integrally secured to the inner surface of the metal casing 61 at the position corresponding to one flow directional end of the honeycomb catalyst 62. The clamp ring 64 may be a ring comprised of a suitable metal, for example, and may be welded to the inner surface of the metal casing 61. Furthermore, the end of the metal casing which is located on another flow directional end side of the honeycomb catalyst 62 is formed as a shoulder portion 61*a* which slightly projects radially inward, so that the respective ends of the retainer member 63 and the honeycomb catalyst 62 opposite to the shoulder portion 61*a* with retainer ring 65 therebetween are urged against the shoulder portion 61*a*. In this case, the retainer member 63 is tightly clamped between the clamp ring 64 and the shoulder portion 61*a* on both sides in the flow direction, so as to lock the retainer member in the exhaust gas flow direction. It should be noted that the metal casing 61 is provided with a cone portion 61*b* adjacent to the shoulder portion 61*a*, and a flange 61*c* at the distal end of the cone portion 61*b* for the connection to the exhaust pipe. On the side opposite to the end where the cone portion 61*b* is provided, namely, at the end of the metal casing 61 located on the side of press-fitting the honeycomb catalyst 62, a flange 61*d* is also formed for the connection to an exhaust pipe 66. In this case, it is preferable to provide a spacer ring 67 and a pair of retainer rings 68*a*, 68*b* for clamping the spacer ring 67 therebetween, which are arranged between the honeycomb catalyst 62 and the clamp ring 64 on one hand and the exhaust pipe 66 on the other hand, for defining the axial directional positions respectively of the honeycomb catalyst 62 and the clamp ring 64.

Figure 11:
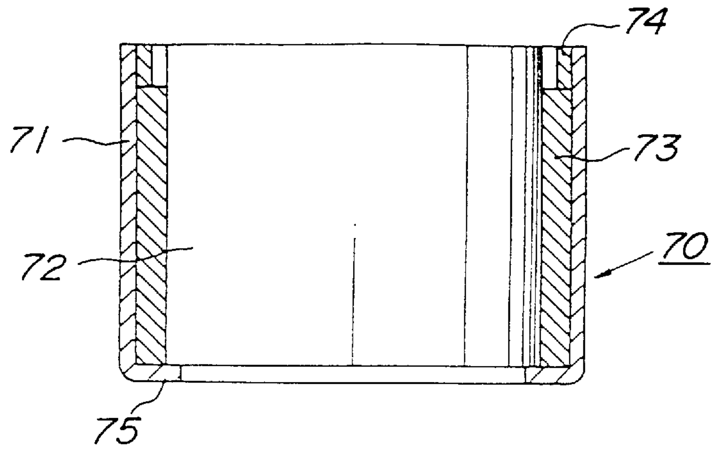
FIG. 11 is a longitudinal-sectional view showing the catalytic converter according to a sixth embodiment of the present invention.
Figure 12:
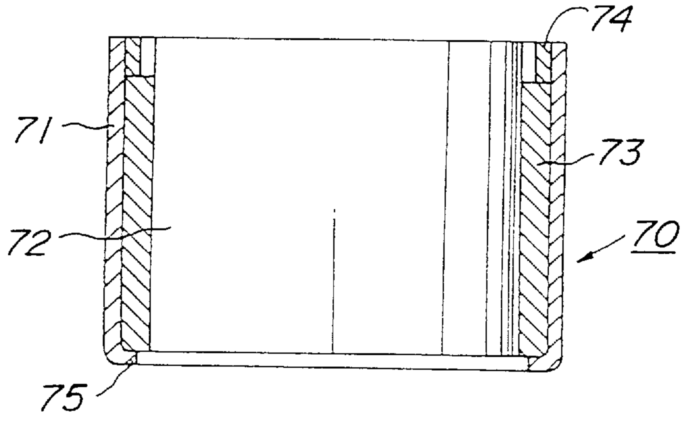
FIG. 12 is a longitudinal-sectional view showing a first modification of the catalytic converter according to the sixth embodiment of the invention.

FIG. 11 is a longitudinal-sectional view showing the sixth embodiment of the catalytic converter according to the present invention, which can be installed in the exhaust system of an internal combustion engine for motorcycles. The catalytic converter 70 of this embodiment includes a hollow cylindrical metal casing 71 of a stuffing-type, a ceramic honeycomb catalyst 72, a retainer member 73 arranged and held compressed between the outer surface of the ceramic honeycomb catalyst 72 and the inner surface of the metal casing 71, and a locking member in the form of clamp ring 74 for clamping the retainer member 73 in the exhaust gas flow direction. In this regard, the catalytic converter 70 of this embodiment is basically same as the catalytic converter of the above-mentioned fifth embodiment. In the present embodiment, at one end of the metal casing 71, there is provided a flange 75 which projects radially inward so as to be brought into contact with the respective ends of the honeycomb catalyst 72 and the retainer member 73. Needless to say, the honeycomb catalyst 72 and the retainer member 73 are press-fitted into the metal casing 71 from another end thereof. Furthermore, a clamp ring 74 for locking the retainer member 73 is fixedly provided adjacent to the retainer member 73 at said another end of the metal casing 71. In this case, the clamp ring 74 may be welded to the metal casing 71, for example. In this embodiment, the exhaust gas flow directional position of the retainer member 73 is fixed by the clamp ring 74, and a flange 75 serves to prevent the honeycomb catalyst 72 from getting loose and subsequently moving about in the flow direction within the metal casing 71.

FIGS. 12 through 15 are longitudinal-sectional views showing various modifications of the catalytic converter according to the above-mentioned sixth embodiment. These modifications are basically same as the sixth embodiment, inclusive of the metal casing of a stuffing-type, so that only major differences will be explained below. For the sake of convenience, the same reference numerals are used to denote elements which substantially or functionally correspond to each other, so as to avoid superfluous description.

In the sixth embodiment explained above, the inner periphery of the flange 75 at one end of the metal casing 71 is positioned rather radially inward beyond the outer periphery of the honeycomb catalyst 72, whereby one end face of the honeycomb catalyst 72 is also brought into contact with the flange 75. In contrast, according to the first modified example shown in FIG. 12, the inner periphery of the flange 75 is positioned slightly on radially outer side of the outer surface of the honeycomb catalyst 72 so that retainer member 73 only has its one end face brought into contact with the flange 75. Even in this case, similarly to the sixth embodiment, the exhaust gas flow directional position of the retainer member 73 is fixed by the clamp ring 74 and the flange 75 so as to prevent honeycomb catalyst 72 from getting loose and subsequently moving about in the flow direction. According to the modified example in FIG. 12, furthermore, the honeycomb catalyst 72 is maintained spaced from the flange 75 to fully use the effective cross sectional area of the honeycomb catalyst 72 in its exhaust gas inlet and outlet ports, and thereby minimize the pressure loss of the exhaust gas in the practical use condition.

Figure 13:
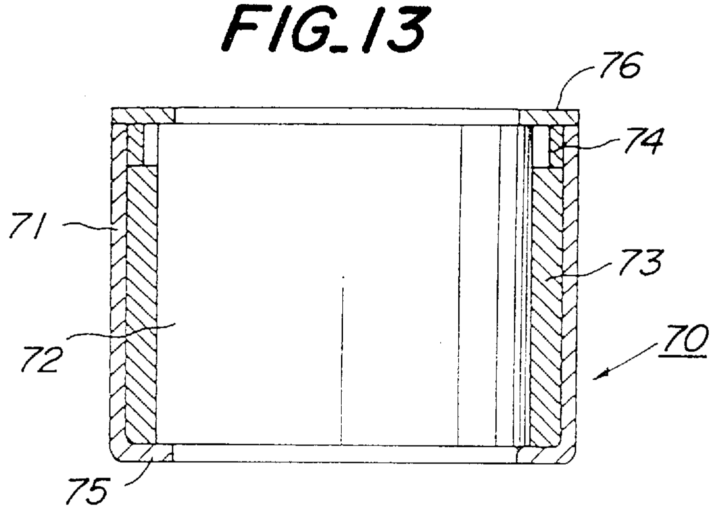
FIG. 13 is a longitudinal-sectional view showing a second modification of the catalytic converter according to the sixth embodiment of the invention.

In the second modified example shown in FIG. 13, the metal casing 71 of the catalyst converter 70 at its one end is provided with a flange 75 which projects radially inward, with which the respective ends of the ceramic honeycomb catalyst 72 and the retainer member 73 are brought into contact. Further, a clamp ring 74 serving as a locking member is provided adjacent to the retainer member 73 at another end side of the metal casing 71, for fixing the exhaust gas flow directional position of the retainer member 73, and a locking ring or retainer ring 76 is welded to another end of the metal casing 71 thereby to position the clamp ring 74. In this way, the retainer member 73 is fixed in the exhaust gas flow direction, so that the honeycomb catalyst 72 accommodated within the metal casing 71 is prevented from getting loose and subsequently moving about in the flow direction. In this case, similarly to the modified example of FIG. 12, the retainer ring 76 and/or the inner periphery of the flange 75 may be positioned slightly on radially outer side of the outer periphery of the honeycomb catalyst 72.

Figure 14:
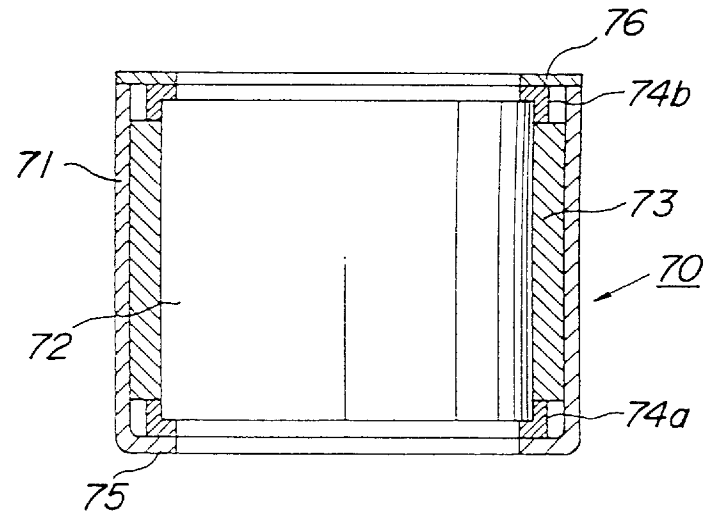
FIG. 14 is a longitudinal-sectional view showing a third modification of the catalytic converter according to the sixth embodiment of the invention.

Also in the third modified example shown in FIG. 14, the metal casing 71 of catalyst converter 70 at its one end is provided with a flange 75 which projects radially inward, and a retainer ring 76 welded to another end of the metal casing 71. As the locking members for locking the exhaust gas flow directional position of the retainer member 73, clamp rings 74*a*, 74*b* each comprised of a metal wire net are provided. These clamp rings 74*a*, 74*b* are arranged respectively between the ends of the honeycomb catalyst 72 and the retainer member 73 on their one side, and between the ends of the honeycomb catalyst 72 and the retainer member 73 on their another side. Therefore, not only the retainer member 73 but also the honeycomb catalyst 72 can be fixed in the exhaust gas flow direction with the clamp rings 74*a*, 74*b* respectively cooperating with the flange 75 and the retainer ring 76. Consequently, the honeycomb catalyst 72 accommodated within the metal casing 71 is prevented from getting loose and subsequently moving about in the flow direction.

Figure 15:
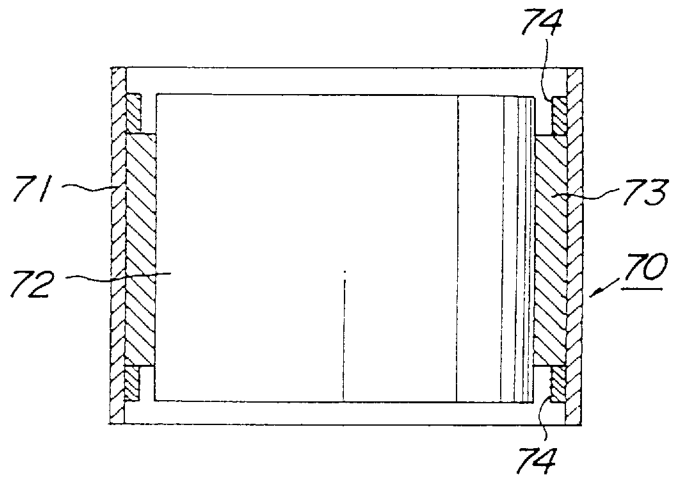
FIG. 15 is a longitudinal-sectional view showing a fourth modification of the catalytic converter according to the sixth embodiment of the invention.

In the fourth modified example shown in FIG. 15, the metal casing 71 of the catalyst converter 70 comprises a cylindrical body without the flange 45 as shown in FIGS. 11 through 14. In this case, the clamp ring 74 for fixing the retainer member 73 is provided and locked adjacent to the retainer member 73 at each end of the metal casing 71. Preferably, each clamp ring 74 is fixedly secured to the metal casing 71 by welding, for example. This modification serves to fix the exhaust gas flow directional position of the retainer member 73 with the clamp rings 74 provided on both sides thereof, so that the honeycomb catalyst 72 accommodated within the metal casing 71 is prevented from getting loose and subsequently moving about in the flow direction.

Figure 16:
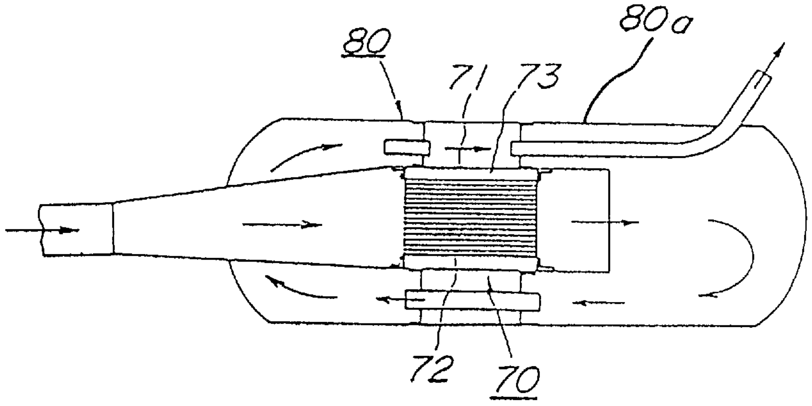
FIG. 16 is a longitudinal-sectional view showing a muffler for motorcycles, in which the catalytic converter is accommodated.

FIG. 16 is a longitudinal-sectional view showing one example of catalytic converter 70 for motorcycles, of which the metal casing 71 is incorporated in a muffler 80 having muffler body 80*a*. With reference to FIG. 16, the exhaust gas flow direction is shown by an arrow mark. The catalytic converter 70 of the above-mentioned arrangement is not exposed to the open air and is thus hard to be cooled, so that the metal casing 71 and the retainer member 73 are heated up to extremely high temperatures. This results in expansion of the metal casing 71 and decrease in the retaining force of the retainer member 73 to such an extent that the honeycomb catalyst 72 gets loose and subsequently moves about to occasionally suffer from premature wear and damages.

Therefore, in order to realize a sufficient surface pressure for stably retaining the ceramic honeycomb catalysts 52, 62, 72 in place even under a high temperature condition of the catalytic converter, for each of the fourth to sixth embodiments and examples modified therefrom, the retainer member 53, 63, 73 is advantageously comprised of a heat resistant and non-intumescent ceramic fiber mat having the compression characteristic which is substantially free from a significant change within the practical temperature range of these catalyst converters. In this connection, the ceramic fibers for such a mat are preferably comprised of at least one member selected from the group consisting of alumina, mullite, silicon carbide, silicon nitride and zirconia, and are substantially free from organic binders or vermiculite and the like expandable component. Further, the diameter of the ceramic fibers for such a mat is preferably not less than 2 $\mu$m but not greater than 6 $\mu$m. Preferably, such a ceramic mat has a nominal thickness of 5–30 mm and a bulk density of 0.05–0.3 g/cm$^3$ in its non-compressed state, and exhibits a compression characteristic capable of generating a surface pressure of at least 1 kgf/cm$^2$ when heated up to 1000° C. after being applied with an initial surface pressure of 2 kgf/cm$^2$ at room temperature. In this case, from the viewpoint of the pyro-strength characteristic of the ceramic fibers and the production cost thereof, mullite fibers can be particularly suitably adopted. As mentioned hereinabove, such heat resistant and non-intumescent ceramic mats are commercially available under the trade names of "MAFTEC", a product of Mitsubishi Chemical and "DENKA ALCEN", a product of Denki Kagaku Kogyo. To optimally clamp the retainer members 53, 63, 73 in the exhaust gas flow direction, the compression margin of the ceramic fiber mat in the exhaust gas flow direction is preferably not less than 2 mm per unit length 100 mm of the honeycomb catalyst 52, 62, 72. Also, when the present invention is applied to a stuffing-type catalytic converter, it is desired for the ceramic fiber mat to have a bulk density of at least 0.2 g/cm$^3$ in the non-compressed state, since a ceramic fiber mat having a bulk density of less than 0.2 g/cm$^3$ in the non-compressed state may give rise to difficulties to achieve the desired push-in operation.

Figure 17:
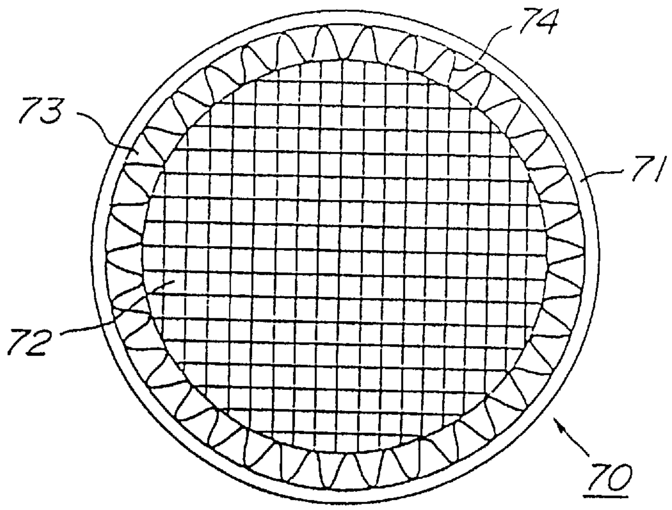
FIG. 17 is a longitudinal-sectional view showing a fifth modification of the catalytic converter according to the sixth embodiment of the invention.

Further, in either of the above-mentioned fourth to sixth embodiments and the examples modified therefrom, it is only necessary for the locking members 54*a*, 54*b*, 64, 74, 74*a*, 74*b* to achieve the function of clamping and locking the retainer members 53, 63, 73 in the exhaust gas flow direction when catalyst converter 70 is put into practical use. Namely, it is not essential for the locking member to be of such a configuration as to continuously extend over the entire circumference of the retainer member. The locking members may be of two-piece structure or a multi-split type divided in the circumferential direction into a plurality of segments. However, from the standpoint of optimally clamping the retainer members in the exhaust gas flow direction, each locking member should be of such a configuration as to extend over more than ½, preferably more than ⅔, of the entire circumference of the retainer member. Basically, the locking members may be of any configuration and may, for example, be in the form of a clamp ring 74 comprised of a heat resistant metal sheet processed into a corrugated configuration as shown in FIG. 17 which shows still another example modified from the sixth embodiment.

As fully explained above, the present invention in its second aspect is constituted so that each retainer member 53, 63, 73 serves to retain the ceramic honeycomb catalyst 52, 62, 72 in place within each of metal casing 51, 61, 71 and is clamped or otherwise locked in the exhaust gas flow direction by the locking member 54*a*, 54*b*, 64, 74, 74*a*, 74*b*. In order to examine the advantageous effects available with such an arrangement of the present invention, a heating/vibrating test was implemented, using the catalyst converters according to the embodiments of FIGS. 9 through 14, and other comparative catalyst converters which are substantially same in constitution but slightly different in that the latter are not provided with the locking members of the present invention. The test was performed by changing the compression margin of the retainer members, the surface pressure thereof, the vibro-acceleration thereof, and the respective duration of heating and vibration thereof. Upon completion of the heating/vibrating test, the retainer members were inspected to ascertain whether or not they had abnormality, and the catalyst carriers were examined in terms of their retention conditions. The test results are shown in Table 6 below.

TABLE 6

| | Catalyst volume (l) | Margin for compression[3)] (mm) | Surface pressure (kg/cm$^2$) | Heating/vibrating test[1)] Acceleration G | Time hr | Test results |
|---|---|---|---|---|---|---|
| Comparative Example 1 | 1.7 | — | 2.0 | 30 | 12 | Retainer member scattered. Carrier displaced. |
| Present Invention (FIG. 9) | | — | 2.0 | 30 | 200 | No abnormality |
| | | — | | 50 | 200 | No abnormality |
| Comparative | 1.1 | — | 2.0 | 30 | 27 | Retainer member scattered. |

TABLE 6-continued

| | Catalyst volume (l) | Margin for compression[3] (mm) | Surface pressure ($kg/cm^2$) | Heating/vibrating test[1] Acceleration G | Time hr | Test results |
|---|---|---|---|---|---|---|
| Example 2 | | | | | | Carrier displaced. |
| Present Invention | | — | 2.0 | 30 | 200 | No abnormality |
| (FIG. 10) | | — | | 50 | 200 | No abnormality |
| Comparative | 0.11 | — | 1.3 | 30 | 2 | Retainer member scattered. |
| Example 3 | | — | 2.0 | 30 | 11 | Carrier fell off. |
| | | — | 5.2 | 30 | 24 | |
| | | — | 8.0 | 30 | 30 | |
| Present Invention | | 0 | 2.0 | 30 | 200 | No abnormality |
| (FIG. 11) | | 0 | 2.0 | 50 | 63 | Retainer member scattered. |
| | | 2 | 2.0 | 50 | 200 | No abnormality |
| | | 2 | 2.0 | 80 | 17 | Retainer member scattered. |
| | | 6 | 2.0 | 80 | 200 | No abnormality |
| | | 10 | 2.0 | 80 | 200 | No abnormality |
| Present Invention (FIG. 12) | | 2 | 2.0 | 80 | 200 | No abnormality |
| Present Invention (FIG. 13) | | 2 | 2.0 | 80 | 200 | No abnormality |
| Present Invention (FIG. 14) | | 2 | 2.0 | 80 | 200 | No abnormality |

[1]The vibrating frequency for the vibration test was 200 Hz.
[2]The retainer member comprised of "MAFTEC" (trade name), a product of Mitsubishi Chemical.
[3]The compression margin indicated in table 6 above is per 100 mm unit length of the ceramic honeycomb carrier.

It can be appreciated from the the foregoing that the present invention in its second aspect is to provide at least one locking member in connection with a retainer member which serves to retain the ceramic honeycomb catalyst in place within the metal casing, and to clamp or otherwise lock the retainer member in the exhaust gas flow direction by the locking member. It is thus possible to prevent the honeycomb catalyst from getting loose and subsequently moving about in the flow direction, even when the retention force applied from the outer side of the catalyst is decreased when exposed to intensive heat, and to positively prevent the honeycomb catalyst from undergoing premature wear and damage.

While the present invention has been described with reference to specific embodiments, they were presented by way of examples only. It is of course that various changes and modifications may be made without departing from the scope of the invention as defined by the appended claims.

We claim:

1. A ceramic honeycomb catalytic converter comprising: a metal casing; a ceramic honeycomb catalyst accommodated in said casing; and a retainer member comprising a ceramic fiber mat disposed in a compressed state between an outer surface of the honeycomb catalyst and an inner surface of the casing, thereby generating a surface pressure for retaining said honeycomb catalyst in place within said casing; wherein said ceramic fiber mat comprises heat resistant and non-intumescent ceramic fibers and has a compression characteristic which is substantially free from increase or decrease over an operative temperature range of the catalytic converter, and the compression characteristic of said ceramic fiber mat is defined by the ceramic fiber mat maintaining a surface pressure of not less than 1 $kgf/cm^2$ at 1000° C. after being subjected to an initial surface pressure of 2 $kgf/cm^2$ at room temperature and further wherein said casing is provided with at least one locking member for locking said ceramic fiber mat in a flow direction of exhaust gas passed through the honeycomb catalyst, said at least one locking member maintaining said ceramic fiber mat in a compressed state in which the mat is compressed in the exhaust gas flow direction by a compression amount of no less than 2 mm per a unit length of 100 mm of the honeycomb catalyst.

2. The ceramic honeycomb catalytic converter of claim 1, wherein said ceramic fiber mat has a nominal thickness of 5–30 mm and a bulk density of 0.05–0.3 $g/cm^3$ in an uncompressed state.

3. The ceramic honeycomb catalytic converter of claim 1, wherein the ceramic fibers forming said ceramic fiber mat comprise at least one member selected from a group consisting of alumina, mullite, silicon carbide, silicon nitride and zirconia, and have a fiber diameter which is at least 2 $\mu$m and no greater than 6 $\mu$m.

4. The ceramic honeycomb catalytic converter of claim 1, wherein said ceramic honeycomb catalyst comprises a ceramic honeycomb structural body having a peripheral wall, and partition walls inside of the peripheral wall, for defining a number of flow passages of a polygonal cross-section arranged adjacent to each other, said peripheral wall having a thickness of at least 0.1 mm, said partition walls having a thickness of 0.050–0.150 mm, and said honeycomb structural body having an open frontal area of 65–95%.

5. The ceramic honeycomb catalytic converter of claim 4, wherein said ceramic honeycomb catalyst has an A-axis compression strength of no less than 50 $kg/cm^2$ and a B-axis compression strength of no less than 5 $kg/cm^2$.

6. The ceramic honeycomb catalytic converter of claim 1, wherein said locking member is adapted to lock an end surface of the honeycomb catalyst in the exhaust gas flow direction.

7. The ceramic honeycomb catalytic converter of claim 1, wherein at least one of said locking member and said metal casing has an inner periphery which is greater in dimension than an outer periphery of the honeycomb catalyst.

8. The ceramic honeycomb catalytic converter of claim 1, wherein said locking member comprises a ceramic material.

9. The ceramic honeycomb catalytic converter of claim 1, wherein said locking member comprises a metallic material.

10. The ceramic honeycomb catalytic converter of claim 9, wherein said locking member comprises a metallic wire mesh.

11. The ceramic honeycomb catalytic converter of claim 1, wherein said metal casing is of a stuffing type.

12. The ceramic honeycomb catalytic converter of claim 1, wherein said metal casing is of a rolling type.

13. The ceramic honeycomb catalytic converter of claim 1, wherein said metal casing is of a clam-shell type.

14. The ceramic honeycomb catalytic converter of claim 1, wherein said ceramic fibers are free from expansive materials including organic binders and vermiculite.

15. A ceramic honeycomb catalytic converter consisting essentially of: a metal casing; a ceramic honeycomb catalyst accommodated in said casing; and a retainer member comprising a ceramic fiber mat disposed in a compressed state between an outer surface of the honeycomb catalyst and an inner surface of the casing, thereby generating a surface pressure for retaining said honeycomb catalyst in place within said casing; wherein said ceramic fiber mat comprises heat resistant and non-intumescent ceramic fibers and has a compression characteristic which is free from a significant increase or decrease over an operative temperature range of the catalytic converter, and the compression characteristic of said ceramic fiber mat is defined by the ceramic fiber mat maintaining a surface pressure of not less than 1 kgf/cm$^2$ at 1000° C. after being subjected to an initial surface pressure of 2 kgf/cm$^2$ at room temperature and further wherein said casing is provided with at least one locking member for locking said ceramic fiber mat in a flow direction of exhaust gas passed through the honeycomb catalyst, said at least one locking member maintaining said ceramic fiber mat in a compressed state in which the mat is compressed in the exhaust gas flow direction by a compression amount of no less than 2 mm per a unit length of 100 mm of the honeycomb catalyst.

16. A muffler assembly, comprising:

a muffler body; and a catalytic converter provided in said muffler body, said catalytic converter comprising a metal casing, a ceramic honeycomb catalyst accommodated in said casing, and a retainer member comprising a ceramic fiber mat disposed in a compressed state between an outer surface of the honeycomb catalyst and an inner surface of the casing, thereby generating a surface pressure for retaining said honeycomb catalyst in place within said casing, wherein said ceramic fiber mat comprises heat resistant and non-intumescent ceramic fibers and has a compression characteristic which is free from increase or decrease over an operative temperature range of the muffler assembly, and the compression characteristic of said ceramic fiber mat is defined by the ceramic fiber mat maintaining a surface pressure of not less than 1 kgf/cm$^2$ at 1000° C. after being subjected to an initial surface pressure of 2 kgf/cm$^2$ at room temperature and further wherein said casing is provided with at least one locking member for locking said ceramic fiber mat in a flow direction of exhaust gas passed through the honeycomb catalyst, said at least one locking member maintaining said ceramic fiber mat in a compressed state in which the mat is compressed in the exhaust gas flow direction by a compression amount of no less than 2 mm per a unit length of 100 mm of the honeycomb catalyst.

* * * * *